United States Patent [19]

Kamens

[11] Patent Number: 5,253,532
[45] Date of Patent: Oct. 19, 1993

[54] TEMPERATURE COMPENSATED PRESSURE TRANSDUCER WITH DIGITAL OUTPUT FOR LOW VOLTAGE POWER SUPPLY

[75] Inventor: Bruce H. Kamens, Thomaston, Conn.

[73] Assignee: Timex Corporation, Middlebury, Conn.

[21] Appl. No.: 849,627

[22] Filed: Mar. 9, 1992

[51] Int. Cl.$^5$ ............................ G01L 9/06; G01L 19/04
[52] U.S. Cl. ........................................ 73/708; 73/721; 73/727; 374/143
[58] Field of Search ................. 73/708, 706, 707, 727, 73/726, 725, 721, 720, 719, 862, 623, 386, 387, 384, 178 R, 754, 766; 338/4, 3, 42; 368/11, 71, 278, 294, 295; 374/143; 116/34 R

[56] References Cited

U.S. PATENT DOCUMENTS

| | | | |
|---|---|---|---|
| 4,192,005 | 3/1980 | Kurtz | 364/571 |
| 4,510,813 | 4/1985 | Kanazawa | 73/766 |
| 4,622,856 | 11/1986 | Binder et al. | 73/727 |
| 4,715,003 | 12/1987 | Keller | 364/571 |
| 4,765,188 | 8/1988 | Krechmery et al. | 73/708 |
| 4,783,772 | 11/1988 | Umemoto et al. | 73/754 |
| 4,788,521 | 11/1988 | Johnson | 338/4 |
| 5,146,788 | 9/1992 | Raynes | 73/708 |
| 5,193,393 | 3/1993 | Czarnocki | 73/708 |

OTHER PUBLICATIONS

Motorola Semiconductor Application Note (AN922).

*Primary Examiner*—Donald O. Woodiel
*Attorney, Agent, or Firm*—William C. Crutcher; Lise A. Rode

[57] ABSTRACT

A pressure transducer apparatus for use with low voltage supply source. A semiconductor piezoresistive strain gauge bridge provides an analog output of pressure variations which includes errors introduced by variations in the ambient temperature. A non-temperature-sensitive resistor across the bridge input is used to decrease the temperature dependent voltage change necessary for temperature compensation of the strain gauge bridge circuit output. Analog temperature adjustment means, provide as an output a current whose value changes concurrently and in direct proportion to the change occurring in the strain gauge bridge circuit current. An analog to digital converter has as its analog input the voltage output of the strain gauge bridge circuit, which is integrated over a first time period, and has as its reference input the temperature-adjusted output current from the analog temperature adjustment means which is integrated over a second time period. Thus by adjusting the reference input to the analog to digital converter, temperature variations in the output of the strain gauge bridge are indirectly compensated.

10 Claims, 2 Drawing Sheets

TEMPERATURE COMPENSATED PRESSURE TRANSDUCER WITH DIGITAL OUTPUT FOR LOW VOLTAGE POWER SUPPLY

BACKGROUND OF THE INVENTION

This invention relates generally to an analog to digital pressure transducer system which is to be used as an altimeter/barometer in instruments such as a wristwatch, where only a low voltage power supply is available to drive the transducer. More particularly this invention relates to an improvement in pressure transducer systems of the type which use a dual-slope integrating analog to digital converter, or a derivative converter thereof.

It is commonly known that semiconductor piezoresistive strain-gauge bridges used in pressure transducer systems have a high positive temperature coefficient of resistance and correspondingly exhibit a high negative temperature coefficient of full-scale span. Thus at any given pressure, variations in ambient temperature will cause errors to be introduced in the output of the strain gauge bridge circuit, which if left uncompensated, will cause errors to be conducted in the output of the analog to digital transducer system itself, giving inaccurate readings as to the input pressure across the strain gauge bridge circuit's diaphragm.

Many methods of temperature compensation have been devised to compensate for such errors. However each of these methods requires a large voltage "overhead" for compensation and/or complex circuitry, both of which are undesirable in instruments of limited physical space and which are driven by a low voltage supply. Thus in order to implement an altimeter/barometer in a wrist instrument, where the device is to be operated from two silver oxide cells or from a single three-volt lithium cell, only a minimal voltage overhead is available for temperature compensation of the strain gauge bridge circuit output. Furthermore any requirement to regulate the battery voltage is undesirable because of the voltage required for regulation and because of the increased circuit complexity which results. Thus it would be desirable to provide a pressure transducer apparatus for a low voltage wrist instrument which requires minimal voltage to compensate for temperature induced errors and eliminates the necessity for voltage regulation.

As stated previously, many methods of temperature compensation are commonly known in the art. One common method of temperature compensation is to drive the strain gauge bridge circuit with a constant voltage source and to provide a resistor in series with the bridge input equal to approximately 3.6 times the strain gauge bridge resistance ($R_x$), "Temperature Compensation, Calibration and Applications of Motorola's X-ducer Pressure Sensor," Harold Nagal, *Motorola Semiconductor Application Note* (AN922), p. 2 (1985); also. U.S. Pat. No. 4,510,813-Kanazawa. This method is unacceptable for low-voltage operation because of the large voltage drop that occurs across this series resistor. Another method of temperature compensation is to drive the strain gauge bridge with a constant - current source with a resistor, having a value of approximately 3.6 $R_x$ and connected across the bridge inputs; See. e.g. *Motorola Semiconductor Application Note* (AN922) at p.2. While this method does not necessitate as large a voltage drop, unwanted additional circuitry in the form of a series regulator and sense register are required in order to generate the constant current.

Additional methods of temperature compensation such as the use of networks consisting of resistors and thermistors or diodes are also undesirable since these temperature-dependent components have the disadvantage of causing an error in transducer output if they are not kept at the same temperature as the transducer. U.S. Pat. Nos. 4,788,521 - Johnson and 4,622,856 - Binder et. al. are examples of inventions which teach compensation for this effect through the design parameters of the passive piezoresistive elements themselves.

Still other methods make use of analog to digital converters as does this invention in order to compensate for errors introduced as a result of ambient temperature variations. Examples are seen in U.S. Pat. Nos. 4,192,055 -Kurtz, 4,715,003 - Keller et. al., and 4,765,188 - Krechmery et. al. Each however entails complex digital circuitry in which either the temperature-related strain gauge bridge circuit output voltage or the temperature of the piezoresistive strain gauge itself is digitized by the analog to digital converter and is then corrected by way of a programmable read-only memory (PROM) and a digital to analog converter, or directly corrected through the use of "lookup" table stored in a memory. As stated previously such complex circuitry is undesirable where the operation of the transducer is to occur in an instrument of limited physical space, such as a wristwatch.

Accordingly, one object of the present invention is to provide an improved circuit for an analog to digital pressure transducer which can be used as an altimeter/-barometer in a wrist instrument to give a highly accurate output yet use very little voltage to drive the transducer.

Another object of the invention is to provide an improved circuit for an analog to digital pressure transducer which requires very little voltage to compensate for errors introduced into the strain gauge bridge circuit output as a result of ambient temperature effects.

Yet another object of the invention is to provide an improved analog to digital pressure transducer which eliminates the need for a stable voltage reference for the analog to digital converter; thus providing analog to digital conversion which requires less supply voltage and less complex circuitry.

SUMMARY OF THE INVENTION

Briefly stated, the invention comprises a pressure transducer apparatus for use in applications where only a low voltage supply is available to drive the pressure transducer. The pressure transducer apparatus comprises: Semiconductor piezoresistive strain gauge bridge circuit means, the output of which is a voltage which includes errors introduced by variations in the ambient temperature; a non-temperature-sensitive resistor placed in parallel with the input of the strain gauge bridge circuit means, whose value is approximately three and six-tenths that of any of the piezoresistive resistors of the strain gauge bridge circuit means, and which is used to decrease the temperature-dependent voltage change necessary for temperature compensation of the strain gauge bridge circuit means output; analog temperature adjustment means, which provides as an output a current whose value changes concurrently and in direct proportion to the change occurring in the strain gauge bridge circuit current; and dual-slope integrating analog to digital converter means which is ratiometric with the supply voltage used to drive the pressure transducer, so that the need for a stable reference voltage is eliminated. The converter means has as its analog input the voltage output of the strain gauge bridge circuit, and has as its reference input the temperature-adjusted output current from the analog temperature adjustment means. The output of the dual-slope integrating analog to digital converter is thus unaffected by variations in the ambient temperature, and is, therefore, indirectly temperature compensated.

DRAWING

The subject matter which is regarded as the invention is particularly pointed out and distinctly claimed in the concluding portion of the specification. The invention, however, both as to organization and method of practice, together with further advantages thereof, may best be understood by reference to the following description, taken in connection with the accompanying drawing, in which:

DESCRIPTION OF THE PREFERRED EMBODIMENT

Figure 1:
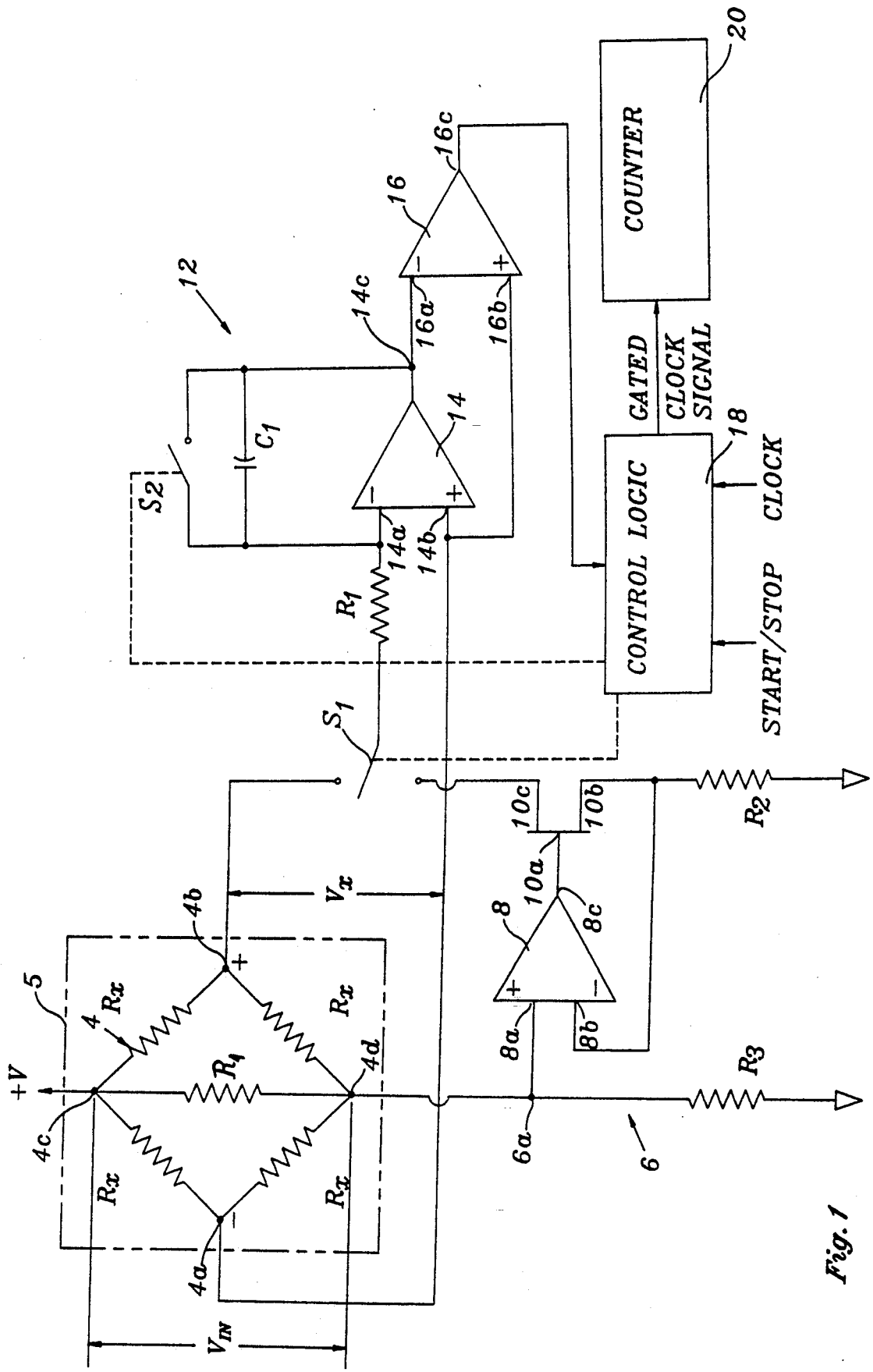
FIG. 1 is a schematic circuit diagram showing the preferred embodiment of the pressure transducer circuit of the present invention.

Referring to FIG. 1 of the drawing, the pressure transducer apparatus of the instant invention, which is driven by a three volt voltage supply $+V$, and which comprises semiconductor piezoresistive strain gauge bridge circuit means shown generally at 4, consisting of piezoresistive resistors of equal resistance $R_x$ electrically connected and arranged in a Wheatstone bridge circuit configuration, with output terminals 4a, 4b and input terminals 4c, 4d and further comprises, a pressure-responsive semiconductor diaphragm (shown generally at 5) upon which the strain gauge bridge circuit is diffused by conventional techniques not material to the present invention.

The pressure transducer apparatus further comprises a non-temperature sensitive resistor $R_4$ connected between terminals 4c, 4d in parallel with the input $V_i$ of said strain gauge bridge circuit 4 and has a resistance value that is approximately three and six-tenths that of one of the piezoresistive resistors $R_x$, or 3.6 $R_x$. The strain gauge bridge circuit 4 is electrically connected to analog temperature adjustment means shown generally at 6, which includes resistor elements $R_2$ and $R_3$. The first, $R_3$, is electrically connected at 6a in series with input $-V_i$ of the strain gauge bridge circuit 4 (said $V_i$ voltage representing the potential between voltage supply $+V$ and common Junction 6a) and is connected to the non-inverting input terminal 8a of an operational amplifier 8 of unity gain. The output of operational amplifier 8 is electrically connected to the gate 10a of a junction field-effect transistor 10. The source 10b of this transistor 10 is electrically connected to the inverting input terminal 8b of the operational amplifier 8 as well as being electrically connected to the second resistor element $R_2$. The drain 10c of this transistor 10 is periodically connected to the input resistor $R_1$ of a dual-slope integrating analog to digital converter means 12 whose description now follows.

The dual-slope integrating analog to digital converter means shown generally at 12, consists of an integrating operational amplifier 14 having an inverting input terminal 14a electrically connected through input resistor R1 to switching means $S_1$, and is directly connected to one side of switching means $S_2$. Switching means $S_1$ and $S_2$ may be mechanical or solid state switches controlled by control logic 18. By means of switching means $S_1$, the input 14a of operational amplifier 14 is alternately connected to the output $-V_x$ of the strain gauge bridge circuit means 4 and the output of the temperature compensating reference current source which constitutes the drain 10c of the field-effect transistor 10. The non-inverting terminal 14b is connected to the negative reference point 4a of the strain gauge bridge circuit 4. The integrating operational amplifier includes capacitor $C_1$, which is electrically connected in a feedback arrangement between inverting terminal 14a and output 14c of the integrating operational amplifier 14. The output 14c of the integrating operational amplifier 14 is also electrically connected to the inverting input 16a of an operational amplifier 16 functioning as a comparator. The non-inverting terminal 16b is electrically connected to the non-inverting terminal 14b of the integrating operational amplifier and therefore is also connected to the negative reference point 4a of the strain gauge bridge circuit 4.

The output 16c of the comparator 16 is electrically connected to control logic means 18 which in a known manner operates switching means $S_1$ and $S_2$ to control the input to the converter means 12, and the charging or discharging of capacitor $C_1$, respectively, i.e. as a dual slope integrating analog to digital converter. The control logic means 18 are electrically connected to counter means 20 to provide a digital output signal.

OPERATION OF THE INVENTION

Variation of force due to pressure change on a diaphragm (not shown) upon which is diffused the silicon strain gauge bridge circuit 4 results in a voltage output $V_x$ which is proportional to that pressure applied and which is ratiometric with the voltage V supplied by the voltage source $+V$ used to drive the pressure transducer. As the ambient temperature varies, $V_x$ varies correspondingly. This must be compensated in order that the digital output from analog to digital converter means 12 accurately represents the pressure applied across the diaphragm.

As known to those skilled in the art, a resistor connected in series with a strain gauge bridge circuit, such as the resistor $R_3$ connected with bridge circuit 4 (FIG. 1), can be used to compensate for errors introduced by the variations in ambient temperature. However, since the strain gauge bridge circuit has a positive temperature coefficient of approximately 0.24%/°C., the voltage $V_{R3}$ increases with increases in temperature. Thus, with increasing temperature, the voltage drop across $R_3$ becomes great, resulting in a small output gain over the strain gauge bridge circuit 4. This is undesirable in an instrument which has a low voltage supply and for which only a minimal voltage "overhead" is available for temperature compensation.

Thus, in accordance with the present invention, connection of a non-temperature-sensitive resistor $R_4$ having a value of approximately 3.6 $R_x$ and electrically connected in parallel with the input 4c, 4d of the strain gauge bridge circuit 4 can be used to attenuate the change in voltage occurring over $R_3$. Connection of $R_4$ in the aforesaid manner will cause the strain gauge bridge circuit 4 to realize a temperature coefficient of $-0.19\%/°C$., which corresponds to the temperature coefficient of full scale span for said strain gauge bridge circuit 4. Because $R_4$ is not temperature sensitive, the temperature coefficient of full scale span for strain gauge bridge circuit 4 will remain at $-0.19\%/°C$. irrespective of changes in ambient temperature. Further, the resulting voltage across $R_3$ will also then exhibit a temperature coefficient of $-0.19\%/°C$.

Also, in accordance with the present invention, the voltage across $R_3$ is introduced at the noninverting terminal 8a of a unity gain operational amplifier 8 whose output terminal 8c is connected to the gate 10a of a junction field-effect transistor (JFET) 10. As the source 10b of the JFET 10 is fed back into the inverting terminal 8b of the operational amplifier 8, the operational amplifier 8 has a gain of 1 and thus the ratio of output voltage to input voltage of the operational amplifier 8 is 1. Given the electrical connection of resistors $R_3$ and $R_2$ to the noninverting and inverting terminals, 8a and 8b respectively, the voltage across $R_2$ must be equal to that across $R_3$.

$$\text{Gain} = V_{out}/V_{in} = V_{R2}/V_{R3} = 1$$

Therefore $V_{R2} = V_{R3}$ Thus the voltage over $R_2$ will equal the voltage over $R_3$ and will thus also exhibit a temperature coefficient of $-0.19\%/°C$.

As is shown in FIG. 1, $R_2$ is further connected to the source 10b of the JFET 10. It is generally known that the high impedance of field-effect transistor will prevent any current from flowing through the gate 10a. As a result, the current through transistor drain 10a ($I_D$) is equal to that current flowing through the transistor's source 10b and $R_2$ ($I_{R2}$). Thus: $I_D = I_{R2} = V_{R2}/R_2$. Therefore, since the current through the transistor drain is equal to the ratio of the voltage drop across resistance $R_2$ to resistance $R_2$, and the voltage drop across $R_2$, as stated previously, has a temperature coefficient of $-0.19\%/°C$., the drain current also has a temperature coefficient of $-0.19\%/°C$.

The current through the transistor drain 10a is also the reference current $I_{ref}$ for the dual-slope integrating analog to digital converter means 12 (FIG. 1). Thus $I_D = I_{ref}$. Therefore, the analog input and reference input of the converter means have a temperature coefficient of $-0.19\%/°C$. I.e. both the output voltage $V_x$ of strain gauge bridge circuit 4 and the output drain current $I_D$ (or $I_{ref}$) have temperature coefficients of $-0.19\%/°C$. The import of this characteristic will be explained in the following section.

As previously stated, the strain gauge bridge circuit output $V_x$ and the output current of the analog temperature adjustment means 6 provide the alternate inputs to the dual slope integrating analog to digital convertor means 12. The dual-slope integrating analog to digital converter is desirable in that the ultimate accuracy of the digital output is determined only by the stability of the reference voltage. The general operation of the converter means is well known to those skilled in the art and is as follows: The analog output $V_x$ is integrated for a fixed time (i.e. for a fixed count) as determined by the control logic means 18. The resulting integrated output voltage is then returned to the starting voltage by integrating the analog temperature adjustment means output, or reference current, which is of opposite polarity. The length of time needed for the integrator output to be returned to the starting voltage is proportional to the value of the input signal averaged over the first integration period.

More specifically, with reference to FIG. 1, prior to start of the analog to digital conversion, the switching means S2 is closed, and the integrator output 14c is clamped to the reference voltage (which is the negative output of the strain gauge bridge circuit 4, or $-V_x$) Switching means S1 is connected to the analog output $V_x$ of the strain gauge bridge circuit 4. At a time $t_o$ which is the beginning of the first phase of the conversion cycle, switching means S2 is opened, the capacitor $C_1$ begins to charge, and, the input signal $+V_x$ is integrated for a predetermined time period $t_1$, which is normally equal to the ratio of $N_{max}$ to the frequency of the clock; where $N_{max}$ is equal to the count stored in the counter means 20 when the counter is full. At this time control logic means 18 resets the counter means 20 to zero and causes switching means S1 to be connected to the output current of analog temperature compensation means 6, or $I_{ref}$. Counter means 20 is enabled through a second period $t_2$ until the integrator output 14c reaches the reference starting voltage. At this time the counter holds a digital count N.

Figure 2:
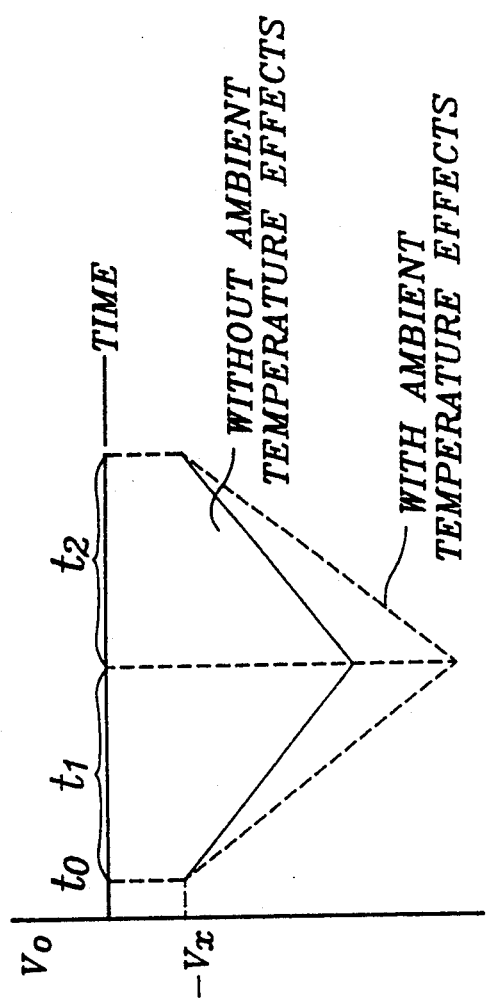
FIG. 2 is a voltage versus counter time waveform diagram comparing the output of the integrator of a dual slope analog to digital converter at two ambient temperatures with a constant pressure applied to the transducer.
Figure 3:
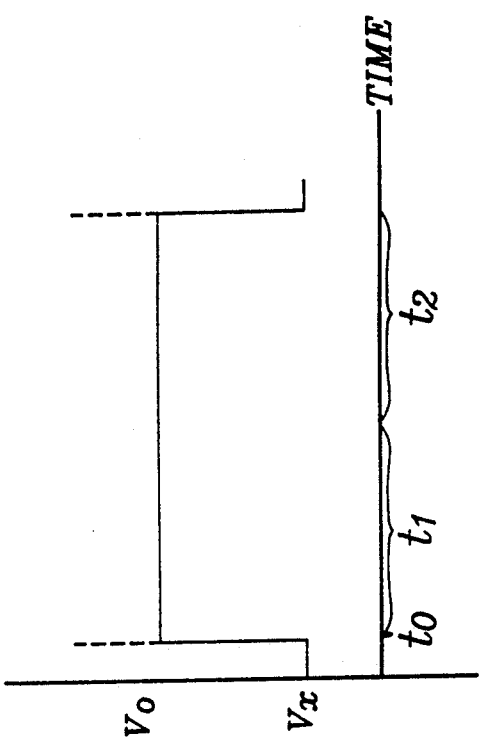
FIG. 3 is a voltage versus counter time waveform diagram comparing the output of the comparator of a dual slope analog to digital converter at two ambient temperatures with a constant pressure applied to the transducer.

With reference to FIG. 2, and as is generally known in the art, the integrator output 14c slews at a rate of $V_{in}/R_1C_1$ for period $t_1$. As $V_{in}$ is equal to $-V_x$ in the instant invention, the slope of the ramp is equal to $+V_x/R_1C_1$. For period $t_2$ it is also generally known that the integrator output 14c slews at a rate of $I_{ref}/C_1$ where $I_{ref}$ is equal to the reference current (here analog temperature adjustment means output current). Reference to FIG. 3 shows the general output 16c of the comparator means.

The combination of time periods $t_1$ and $t_2$ constitute one full conversion cycle. It is generally known to those skilled in the art that the digital count N is equal to:

$$(V_{in} * C_1/I_{ref}) * f,$$

where f is equal to clock frequency in hertz of the control logic means 18

Substituting the parameters of the instant invention, the digital count N becomes:

$$(V_x * C_1/I_{ref}) * f,$$

where f is equal to clock frequency of the control logic means 18

The values of the capacitor $C_1$ and the clock frequency are constant and thus the digital count varies only as the two analog integrator inputs vary. Furthermore, digital output N is proportional to the input pressure across the diaphragm of strain gauge bridge circuit means 4. Accordingly, again with reference to FIGS. 2 and 3, because both the output of the strain gauge bridge circuit 4 and the output current of the analog temperature compensation means 6 have a temperature coefficient of $-0.19\%/°C$., the numerator and denominator of the equation above will change proportionately, and thus any errors introduced as a result of variations in ambient temperature will not affect the digital count N. Therefore the digital output will accurately reflect the input pressure and the output $V_x$ of the strain gauge bridge circuit 4 has been indirectly temperature-compensated.

Finally, because the digital output equals the digital count N (and thus proportional to $V_x$ and $I_{ref}$), and $V_x$ is ratiometric to the supply to voltage V, the digital output is constant with supply voltage V, thus the need for a voltage regulator or constant current/voltage supply to provide a stable reference voltage is eliminated. Accordingly, as any additional voltage needed to provide for such a stable reference voltage is eliminated, more voltage is available to drive a low voltage device such as a wrist instrument. Elimination of a voltage regulator or constant current/voltage supply to provide for such a stable reference voltage also reduces the complexity of the circuitry of the wrist instrument or other device driven by low voltage.

While the preferred embodiment of the pressure transducer discloses the use of a dual-slope integrating analog to digital converter, the invention may instead be provided with derivatives of this converter such as a charge-balancing analog to digital converter.

While there has been disclosed what is considered to be the preferred embodiment of the invention, it is desired to cover in the appended claims all such modifications as fall within the true spirit and scope of the invention.

I claim:

1. Pressure transducer apparatus for use with a low voltage supply source comprising:
   strain gauge bridge circuit means including a plurality of piezoresistive resistors of equal resistance electrically connected in a bridge circuit having input and output terminals and disposed on a pressure-responsive diaphragm, said strain gauge bridge circuit means being capable when biased with a constant voltage source of providing an output voltage which is proportional to the pressure applied to said diaphragm and which output voltage is ratiometric with the voltage supplied by said voltage source;
   a substantially non-temperature-sensitive resistor element electrically connected in parallel with the input terminals of said strain gauge bridge circuit means and having a resistance value of approximately three and six-tenths that of one of said piezoresistive resistors;
   analog temperature adjustment means for compensating for errors introduced in said strain gauge bridge circuit means output voltage caused by variations in ambient temperature,
   said analog temperature adjustment means having an input connected to a current-sensing resistor in series with said strain gauge bridge circuit means and also having an output, and adapted so that the output of said analog temperature adjustment means is an output current whose value changes concurrently and in direct proportion to variations in said bridge circuit output voltage as a result of variations in ambient temperature, and
   dual-slope integrating analog to digital converter means having an input and an output, said converter means electrically connected to alternately receive as input said strain gauge bridge circuit output and said analog temperature adjustment means output, whereby the output of said analog to digital converter is temperature compensated.

2. The pressure transducer apparatus of claim 1, wherein said analog temperature adjustment means comprises:
   first and second resistor elements, said first resistor element being electrically connected in series with the input of said strain gauge bridge circuit means,
   an operational amplifier having inverting and non-inverting inputs, said first resistor element being electrically connected to said noninverting input terminal of said operational amplifier, and
   a junction field-effect transistor having gate, source and drain, said gate of said transistor electrically connected to the output of said operational amplifier, said source of said transistor electrically connected to said inverting input of said operational amplifier and to said second resistor element, said drain of said transistor being electrically connected to provide a reference current for said analog to digital converter means.

3. The pressure transducer apparatus of claim 2 wherein the voltage across said first resistor element equals the voltage across said second resistor element.

4. The pressure transducer apparatus of claim 2 wherein resistance of said first resistor is substantially lower than the resistance across said bridge circuit input, whereby the voltage drop across said first resistor is a very small fraction of the voltage provided by said voltage supply.

5. The pressure transducer apparatus of claim 2 wherein said reference current comprises the drain to source current of said field-effect transistor, said reference current being directly proportional to said voltage drop across said first resistor element.

6. The pressure transducer apparatus of claim 2 wherein the value of said reference current is proportional to the sum of the currents through said strain gauge bridge circuit and said first resistor element.

7. The pressure transducer apparatus of claim 1 wherein said dual slope integrating analog to digital converter means comprises:
   an integrating operational amplifier wherein the inverting terminal of said operational amplifier is alternately connected to receive as an input said strain gauge bridge circuit output and said output current of said analog temperature adjustment means and the non-inverting terminal of said operational amplifier is connected to the negative reference of said stain gauge bridge circuit output;
   counter means adapted to store a value which is proportional to the ratio of said output of said strain gauge bridge circuit and said output of said analog temperature adjustment means;
   first switching means adapted to alternatively connected said inverting terminal of said integrating operational amplifier with said strain gauge bridge circuit output and said analog temperature adjustment means output;
   second switching means adapted to cause the capacitor of said integrating operational amplifier to alternately charge and discharge over a predetermined count on said counter means;
   control logic means adapted to control said first an second switching means and said counter means; and,
   comparator means comprising an operational amplifier, the inverting terminal of said operational amplifier being electrically connected to receive the output of said integrating operational amplifier, the non-inverting terminal of said comparator means also being electrically connected to said negative reference of said strain gauge bridge circuit output, and the output of said comparator means being electrically connected to said control logic means.

8. Pressure transducer apparatus for use with a low voltage supply source, comprising:

strain gauge bridge circuit means including four piezoresistive resistors of equal resistance electrically connected in a bridge having input terminals and output terminals, said resistors disposed on a pressure-responsive diaphragm subject to ambient temperature and pressure variations;

a substantially non-temperature-sensitive resistor electrically connected in parallel with said strain gauge bridge input terminals and having a resistance value of approximately three and six-tenths that of one of said piezoresistive resistors;

analog temperature adjustment means comprising a first resistor connected in series at a first junction with said parallel-connected non-temperature resistant resistor and strain gauge bridge input terminals, an operational amplifier having a noninverting input connected to said first junction, a junction field effect transistor having a gate, a drain and a source, said gate connected to the output of said operational amplifier, a second resistor connected to the inverting input of said operational amplifier and also connected to the source of said transistor, said first and second resistors being connected to a common potential on the ends thereof opposite said first and second junctions respectively; and dual-slope integrating analog to digital converter means adapted to alternately receive and integrate a first analog input for a first time period and a reference analog input for a second time period and to provide a digital output, said converter means including switching means alternately connecting said converter means to one of said bridge output terminals providing said first analog input for said first time period and to said transistor drain providing said reference analog input for said second time period.

9. Pressure transducer apparatus for use with a low voltage supply source comprising:

strain gauge bridge circuit means including a plurality of piezoresistive resistors of equal resistance electrically connected in a bridge circuit having input and output terminals and disposed on a pressure-responsive diaphragm, said strain gauge bridge circuit means being capable when biased with a constant voltage source of providing an output voltage which is proportional to the pressure applied to said diaphragm and which output voltage is ratiometric with the voltage supplied by said voltage source;

a substantially non-temperature-sensitive resistor element electrically connected in parallel with the input terminals of said strain gauge bridge circuit means and having a resistance value of approximately three and six-tenths that of one of said piezoresistive resistors;

analog temperature adjustment means for compensating for errors introduced in said strain gauge bridge circuit means output voltage caused by variations in ambient temperature, said analog temperature adjustment means having an input connected to a current-sensing resistor in series with said strain gauge bridge circuit means and also having an output, and adapted so that the output of said analog temperature adjustment means is an output current whose value changes concurrently and in direct proportion to variations in said bridge circuit output voltage as a result of variations in ambient temperature, and charge-balancing analog to digital converter means having an input and an output, said converter means electrically connected to alternately receive as input said strain gauge bridge circuit output and said analog temperature adjustment means output, whereby the output of said analog to digital converter is temperature compensated.

10. Pressure transducer apparatus for use with a low voltage supply source, comprising:

strain gauge bridge circuit means including four piezoresistive resistors of equal resistance electrically connected in a bridge having input terminals and output terminals, said resistors disposed on a pressure-responsive diaphragm subject to ambient temperature and pressure variations;

a substantially non-temperature-sensitive resistor electrically connected in parallel with said strain gauge bridge input terminals and having a resistance value of approximately three and six-tenths that of one of said piezoresistive resistors;

analog temperature adjustment means comprising a first resistor connected in series at a first junction with said parallel-connected non-temperature resistant resistor and strain gauge bridge input terminals, an operational amplifier having a noninverting input connected to said first junction, a junction field effect transistor having a gate, a drain and a source, said gate connected to the output of said operational amplifier, a second resistor connected to The inverting input of said operational amplifier and also connected to the source of said transistor, said first and second resistors being connected to a common potential on the ends thereof opposite said first and second junctions respectively; and charge-balancing analog to digital converter means adapted to alternately receive and integrate a first analog input for a first time period and a reference analog input for a second time period and to provide a digital output, said converter means including switching means alternately connecting said converter means to one of said bridge output terminals providing said first analog input for said first time period and to said transistor drain providing said reference analog input for said second time period.

* * * * *